(12) United States Patent
Fujii et al.

(10) Patent No.: US 10,560,036 B2
(45) Date of Patent: Feb. 11, 2020

(54) POWER CONVERSION DEVICE FOR RELIABLE CONTROL OF CIRCULATING CURRENT WHILE MAINTAINING VOLTAGE OF A CELL

(71) Applicant: MITSUBISHI ELECTRIC CORPORATION, Chiyoda-ku, Tokyo (JP)

(72) Inventors: Toshiyuki Fujii, Tokyo (JP); Takushi Jimichi, Tokyo (JP); Ryosuke Uda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 22 days.

(21) Appl. No.: 15/759,050

(22) PCT Filed: Sep. 17, 2015

(86) PCT No.: PCT/JP2015/076432
§ 371 (c)(1),
(2) Date: Mar. 9, 2018

(87) PCT Pub. No.: WO2017/046910
PCT Pub. Date: Mar. 23, 2017

(65) Prior Publication Data
US 2019/0044455 A1  Feb. 7, 2019

(51) Int. Cl.
*H02M 7/483* (2007.01)
*H02M 7/521* (2006.01)
*H02M 7/5387* (2007.01)

(52) U.S. Cl.
CPC .......... *H02M 7/483* (2013.01); *H02M 7/521* (2013.01); *H02M 7/53871* (2013.01); *H02M 2007/4835* (2013.01)

(58) Field of Classification Search
CPC .... H02M 7/483; H02M 7/5387; H02M 7/217; H02M 7/219; H02M 7/484;
(Continued)

(56) References Cited

U.S. PATENT DOCUMENTS 5,065,304 A * 11/1991 Tamai ............... H02M 7/53875
363/95
5,838,127 A * 11/1998 Young ...................... H02P 6/24
318/293

(Continued)

FOREIGN PATENT DOCUMENTS

EP        2 486 645 A1    8/2012
JP      2012-531878 A    12/2012
(Continued)

OTHER PUBLICATIONS

International Search Report (PCT/ISA/210) dated Dec. 22, 2015, by the Japanese Patent Office as the International Searching Authority for International Application No. PCT/JP2015/076430. (5 pages).
(Continued)

*Primary Examiner* — Adolf D Berhane
*Assistant Examiner* — Nusrat Quddus
(74) *Attorney, Agent, or Firm* — Buchanan Ingersoll & Rooney PC

(57) ABSTRACT

Each of a plurality of specified chopper cells which are some of a plurality of chopper cells included in each leg circuit in a power conversion device is configured as a full bridge. A control device controls operations of first and second switching elements of each specified chopper cell based on a circulating current which circulates through each leg circuit. The control device controls operations of third and fourth switching elements of each specified chopper cell based on a voltage of a capacitor of the specified chopper cell.

12 Claims, 6 Drawing Sheets

(58) Field of Classification Search
CPC . H02M 2007/4835; H02M 2007/4834; H02M 2001/0003; H02M 7/10; H02M 7/515; H02M 7/53; H02M 7/537; H02M 7/5383; H02M 7/538466; H02M 7/53862; H02M 7/53871; H02M 7/53875; H02M 7/757; H02M 7/79; H02M 7/538; H02M 7/53835; H02M 7/487; H02M 7/539; H02M 3/073; H02M 3/10; H02M 3/135; H02M 3/137; H02M 3/28; H02M 3/315; H02M 3/3155; H02M 3/325; H02M 3/335; H02M 3/337; H02M 3/338; H02M 3/3382; H02M 3/3384

See application file for complete search history.

(56) References Cited

U.S. PATENT DOCUMENTS

| | | | | |
|---|---|---|---|---|
| 6,229,722 | B1* | 5/2001 | Ichikawa | H02M 7/10 363/71 |
| 6,242,895 | B1* | 6/2001 | Fujii | G05F 1/70 323/207 |
| 9,252,681 | B2* | 2/2016 | Zhang | H02M 7/487 |
| 9,407,157 | B2* | 8/2016 | Gupta | H02J 3/36 |
| 9,712,084 | B2* | 7/2017 | Kikuchi | H02M 7/483 |
| 2009/0244937 | A1* | 10/2009 | Liu | H02M 1/4216 363/46 |
| 2010/0118578 | A1* | 5/2010 | Dommaschk | H02M 7/483 363/127 |
| 2011/0280049 | A1* | 11/2011 | Mori | H02M 1/4216 363/25 |
| 2012/0195084 | A1* | 8/2012 | Norrga | H02M 7/483 363/127 |
| 2013/0155732 | A1* | 6/2013 | Wagoner | H02J 3/01 363/40 |
| 2015/0236603 | A1* | 8/2015 | Jimichi | H02M 5/293 363/37 |
| 2016/0329831 | A1* | 11/2016 | Mukunoki | H02M 7/483 |
| 2016/0336874 | A1* | 11/2016 | Kikuchi | H02M 7/483 |
| 2017/0047860 | A1* | 2/2017 | Fujii | H02M 7/483 |
| 2017/0054294 | A1* | 2/2017 | Lyu | H02J 3/01 |
| 2017/0170658 | A1* | 6/2017 | Tengner | H02J 3/1857 |
| 2017/0214334 | A1* | 7/2017 | Mukunoki | H02M 1/12 |
| 2018/0069488 | A1* | 3/2018 | Mukunoki | H02M 7/48 |
| 2018/0159422 | A1* | 6/2018 | Kikuchi | H02M 7/12 |

FOREIGN PATENT DOCUMENTS

| | | |
|---|---|---|
| JP | 2013-507100 A | 2/2013 |
| JP | 5189105 B2 | 4/2013 |
| WO | 2011/042050 A1 | 4/2011 |
| WO | 2014/133026 A1 | 9/2014 |
| WO | 2014/162620 A1 | 10/2014 |

OTHER PUBLICATIONS

Written Opinion (PCT/ISA/237) dated Dec. 22, 2015, by the Japanese Patent Office as the International Searching Authority for International Application No. PCT/JP2015/076430. (5 pages).

International Search Report (PCT/ISA/210) dated Dec. 22, 2015, by the Japan Patent Office as the International Searching Authority for International Application No. PCT/JP2015/076431. (4 pages).

Written Opinion (PCT/ISA/237) dated Dec. 22, 2015, by the Japan Patent Office as the International Searching Authority for International Application No. PCT/JP2015/076431. (4 pages).

Extended European Search Report dated Aug. 10, 2018, issued by the European Patent Office in European Application No. 15904097.1. (7 pages).

Extended European Search Report dated Sep. 17, 2018, issued by the European Patent Office in corresponding European Application No. 15904099.7. (8 pages).

Office Action (Notification of Reasons for Refusal) dated Nov. 27, 2018, by the Japan Patent Office in corresponding Japanese Patent Application No. 2017-540408 and English translation of the Office Action. (13 pages).

International Search Report (PCT/ISA/210) dated Dec. 22, 2015, by the Japanese Patent Office as the International Searching Authority for International Application No. PCT/JP2015/076432.

Written Opinion (PCT/ISA/237) dated Dec. 22, 2015, by the Japanese Patent Office as the International Searching Authority for International Application No. PCT/JP2015/076432.

Office Action (Communication pursuant to Article 94(3) EPC) dated May 28, 2019, by the European Patent Office in corresponding European Patent Application No. 15904098.9. (6 pages).

* cited by examiner (a)

(b)

(c)

POWER CONVERSION DEVICE FOR RELIABLE CONTROL OF CIRCULATING CURRENT WHILE MAINTAINING VOLTAGE OF A CELL

TECHNICAL FIELD

This invention relates to a power conversion device which converts power between an alternating current (AC) and a direct current (DC) and is suitably used, for example, in a power conversion device of a large capacity installed in a power system.

BACKGROUND ART

In a power conversion device of a large capacity installed in a power system, an output from a converter has a high voltage or a high current and hence the power conversion device is often configured with a plurality of converters being multiplexed in series or in parallel. By multiplexing converters, not only an effect of increase in capacity of the converter but also an effect of lowering in harmonics contained in a waveform of an output voltage as a result of combination of output voltages from the converters and resultant lowering in harmonic current which flows out to the power system can be achieved.

Examples of the power conversion device including multiplexed converters include a multilevel converter in which output terminals of a plurality of converters are cascaded. A modular multilevel converter (MMC) represents one of the multilevel converters. The modular multilevel converter includes a first arm connected to a DC terminal on a positive-electrode side and a second arm connected to a DC terminal on a negative-electrode side for each phase of an alternating current and each arm is configured with a plurality of converter cells (which are also referred to as chopper cells) being cascaded. The first arm and the second arm of each phase implement a leg. Each leg is provided with at least one reactor.

In the modular multilevel converter, a circulating current which circulates through a plurality of legs without flowing to the outside may flow and the circulating current should be controlled to 0 or a prescribed value. Techniques described, for example, in Japanese Patent No. 5189105 (PTD 1) and Japanese National Patent Publication No. 2012-531878 (PTD 2) have been known as the conventional techniques for control of a circulating current.

Japanese Patent No. 5189105 (PTD 1) discloses a multilevel converter having one control unit for controlling and lowering a circulating current for each arm (a phase module branch). Each control unit is given a branch voltage target value from a current control unit. In particular, this document discloses combination by the current control unit of a circulating voltage target value with another target value of a phase module branch as an add-on, that is, in a linear manner, (in a form of a sum or a difference) in order to generate a branch voltage target value.

Japanese National Patent Publication No. 2012-531878 (PTD 2) discloses connection of a harmonic compensator of an active control type to a reactor (an inductor) provided in a leg of each phase in order to control a circulating current. This harmonic compensator is configured to suppress a harmonic component higher in frequency than a fundamental component contained in a circulating current.

CITATION LIST

Patent Document

PTD 1: Japanese Patent No. 5189105
PTD 2: Japanese National Patent Publication No. 2012-531878

SUMMARY OF INVENTION

Technical Problem

More specifically, the power conversion device described in Japanese Patent No. 5189105 (PTD 1) combines a voltage command value for control of an electric quantity (a voltage and a current) of an AC terminal, a voltage command value for control of an electric quantity (a voltage and a current) of a DC terminal, and a voltage command value for control of a circulating current which circulates in the power conversion device with one another. Then, the combined voltage command value is provided to all converter cells (chopper cells).

An upper limit and a lower limit of a voltage value which can be output by each converter cell are determined by a voltage value of a capacitor of each converter cell and a circuit configuration of each converter cell. Therefore, each converter cell cannot output a voltage exceeding the determined upper limit and lower limit. Therefore, for example, increase or decrease in voltage command value for control of electric quantities of an AC terminal and a DC terminal may restrict a voltage command value for control of a circulating current combined with these voltage command values. In this case, a voltage command value for suppressing a circulating current is not reflected on an output voltage from the converter cell. In contrast, under the influence by the voltage command value for control of a circulating current, a voltage command value for control of electric quantities of the AC terminal and the DC terminal is restricted, and consequently AC-DC conversion is not ideally achieved.

The power conversion device described in Japanese National Patent Publication No. 2012-531878 (PTD 2) is configured such that the harmonic compensator of the active control type connected to each reactor (inductor) suppresses a harmonic component higher in frequency than the fundamental component contained in the circulating current. The reactor, however, has such a characteristic that a current is more likely to flow as a frequency is lower (an admittance increases as a frequency is lower), and hence a DC current component and a fundamental component contained in the circulating current cannot be suppressed.

This invention was made in consideration of the problems described above and an object thereof is to provide a power conversion device capable of reliably controlling an AC electric quantity (an AC voltage and an AC current), a DC electric quantity (a DC voltage and a DC current), and a circulating current.

Solution to Problem

This invention relates to a power conversion device which is connected between a DC circuit and an AC circuit and converts power between these circuits, and the power conversion device includes a plurality of leg circuits and a control device. The plurality of leg circuits correspond to respective phases of the AC circuit and are connected in parallel between common first and second DC terminals. Each leg circuit includes a plurality of chopper cells and at least one inductor connected in series to the plurality of chopper cells. The plurality of chopper cells are cascaded to one another and each include an energy storage. Each of a plurality of specified chopper cells which are some of the plurality of chopper cells included in each leg circuit includes a capacitor as the energy storage, first and second switching elements connected in parallel to the capacitor and connected in series to each other, and third and fourth switching elements connected in parallel to the capacitor and connected in series to each other. The capacitor can be charged and can discharge through a connection node of the first and second switching elements and a connection node of the third and fourth switching elements. The control device controls operations of the plurality of chopper cells included in each leg circuit. The control device controls operations of the first and second switching elements of each specified chopper cell based on a circulating current which circulates through each leg circuit. The control device controls operations of the third and fourth switching elements of each specified chopper cell based on a voltage of the capacitor.

Advantageous Effects of Invention

According to this invention, a circulating current is controlled by a specified chopper cell representing at least one chopper cell constituting each leg circuit. Therefore, the circulating current can be controlled without interference with control of an AC electric quantity of an AC circuit and a DC electric quantity of a DC circuit. Since operations of first and second switching elements constituting the specified chopper cell are controlled based on a circulating current and operations of third and fourth switching elements constituting the specified chopper cell are controlled based on a voltage of a capacitor, the circulating current can reliably be controlled while a voltage of the capacitor is maintained constant.

DESCRIPTION OF EMBODIMENTS

Figure 1:
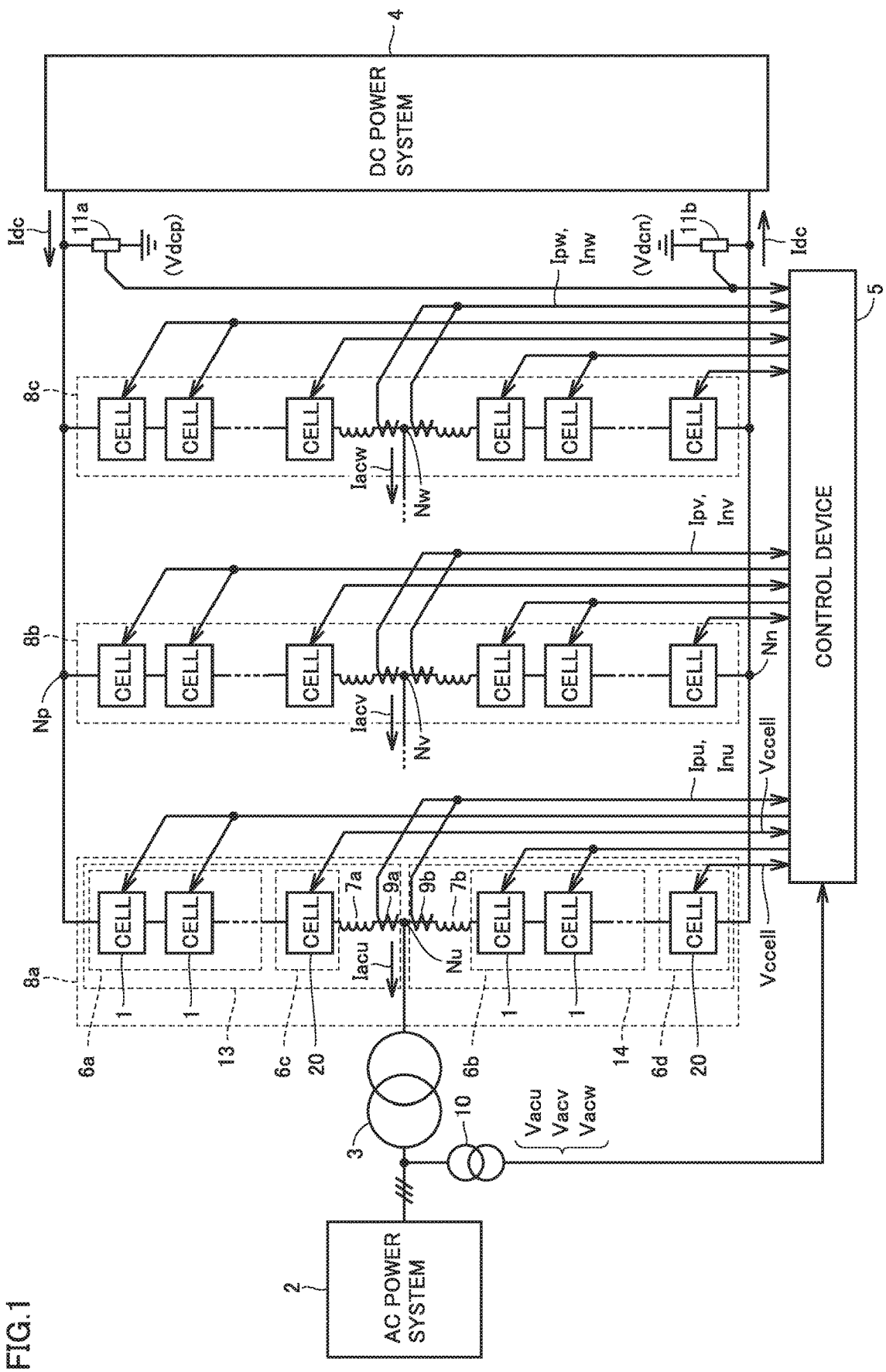
FIG. 1 is a schematic configuration diagram of a power conversion device according to a first embodiment.

Each embodiment will be described below in detail with reference to the drawings. The same or corresponding elements have the same reference characters allotted and description thereof will not be repeated.

First Embodiment

FIG. 1 is a schematic configuration diagram of a power conversion device according to a first embodiment. Referring to FIG. 1, the power conversion device includes leg circuits 8a, 8b, and 8c which are main circuits (which are denoted as a leg circuit 8 when they are collectively referred to or an unspecified one is referred to) and a control device 5 which controls these leg circuits 8.

Leg circuit 8 is provided for each of a plurality of phases implementing an alternating current and connected between an AC circuit 2 and a DC circuit 4, and converts power between these circuits. FIG. 1 shows three-phase AC circuit 2, and three leg circuits 8a, 8b, and 8c corresponding to a u phase, a v phase, and a w phase, respectively, are provided.

AC terminals Nu, Nv, and Nw provided in respective leg circuits 8a, 8b, and 8c are connected to AC circuit 2 with an interconnected transformer 3 being interposed. AC circuit 2 is, for example, an AC power system including an AC power supply. For facilitating illustration, FIG. 1 does not show connection of AC terminals Nv and Nw to interconnected transformer 3. DC terminals Np and Nn (a positive-side DC terminal Np and a negative-side DC terminal Nn) provided in common to leg circuits 8 are connected to DC circuit 4. DC circuit 4 is, for example, a DC power system including a DC power grid and another power conversion device which provides a DC output.

Instead of interconnected transformer 3 in FIG. 1, AC terminals Nu, Nv, and Nw may be connected to AC circuit 2 with an interconnected reactor being interposed. Instead of AC terminals Nu, Nv, and Nw, a primary winding may be provided in each of leg circuits 8a, 8b, and 8c, and leg circuits 8a, 8b, and 8c may be connected in an AC manner to interconnected transformer 3 or an interconnected reactor with a secondary winding magnetically coupled to the primary winding being interposed. In this case, the primary winding may be implemented by reactors 7a and 7b. Each of leg circuits 8a, 8b, and 8c is electrically (in a DC or AC manner) connected to AC circuit 2 with a connection portion provided in each of leg circuits 8a, 8b, and 8c being interposed, such as AC terminals Nu, Nv, and Nw or the above-described primary winding.

Leg circuit 8a is divided into a positive-side arm (which is also referred to as an upper arm or a primary arm) 13 from positive-side DC terminal Np to AC input terminal Nu and a negative-side arm (which is also referred to as a lower arm or a secondary arm) 14 from negative-side DC terminal Nn to AC input terminal Nu. A point of connection Nu between positive-side arm 13 and negative-side arm 14 is connected to transformer 3. Positive-side DC terminal Np and negative-side DC terminal Nn are connected to DC circuit 4. Since leg circuits 8b and 8c are also similarly configured, leg circuit 8a will be described below as a representative.

Positive-side arm 13 includes a cell group 6a in which a plurality of converter cells (chopper cells) 1 are cascaded, a cell group 6c in which a plurality of converter cells 20 are cascaded, and reactor 7a. Cell groups 6a and 6c and reactor 7a are connected in series to one another. For the sake of brevity, a converter cell (chopper cell) may be referred to as a cell below. As described in detail with reference to FIGS. 2 and 3, cell 20 included in cell group 6c may be different in configuration from cell 1 provided in cell group 6a. Though FIG. 1 shows only a single cell 20 in cell group 6c for facilitating illustration, a plurality of cells 20 are actually cascaded.

Similarly, negative-side arm 14 includes a cell group 6b in which a plurality of cells 1 are cascaded, a cell group 6d in which a plurality of cells 20 are cascaded, and reactor 7b. Cell groups 6b and 6d and reactor 7b are connected in series to one another. As described in detail with reference to FIGS. 2 and 3, cell 20 included in cell group 6d may be different in configuration from cell 1 provided in cell group 6b.

Though FIG. 1 shows only a single cell 20 in cell group 6d for facilitating illustration, a plurality of cells 20 are actually cascaded.

Reactor 7a may be inserted in any position in positive-side arm 13 of leg circuit 8a, and reactor 7b may be inserted in any position in negative-side arm 14 of leg circuit 8a. A plurality of reactors 7a and a plurality of reactors 7b may be provided. The reactors may be different in inductance value. Only reactor 7a of positive-side arm 13 or only reactor 7b of negative-side arm 14 may be provided.

Cell groups 6a and 6c provided in positive-side arm 13 are referred to as a positive-side cell group and cell groups 6b and 6d provided in negative-side arm 14 are referred to as a negative-side cell group. As will be described in detail below, positive-side cell group 6a and negative-side cell group 6b are not used for control of a circulating current but are used only for control of an AC electric quantity and a DC electric quantity. Positive-side cell group 6c and negative-side cell group 6d are used for control of a circulating current. Control of a circulating current is characterized in that only at least one cell constituting each leg circuit 8 is used therefor.

The power conversion device in FIG. 1 further includes an AC voltage detector 10, DC voltage detectors 11a and 11b, and arm current detectors 9a and 9b provided in each leg circuit 8 as detectors which measure electric quantities (a current and a voltage) used for control. Signals detected by these detectors are input to control device 5.

Specifically, AC voltage detector 10 detects a U-phase voltage value Vacu, a V-phase voltage value Vacv, and a W-phase voltage value Vacw of AC circuit 2. DC voltage detector 11a detects a voltage of positive-side DC terminal Np connected to DC circuit 4. DC voltage detector 11b detects a voltage of negative-side DC terminal Nn connected to DC circuit 4. Arm current detectors 9a and 9b provided in leg circuit 8a for the U phase detect an arm current Ipu which flows in positive-side arm 13 and an arm current Inu which flows in negative-side arm 14, respectively. Similarly, arm current detectors 9a and 9b provided in leg circuit 8b for the V phase detect a positive-side arm current Ipv and a negative-side arm current Inv, respectively. Arm current detectors 9a and 9b provided in leg circuit 8c for the W phase detect a positive-side arm current Ipw and a negative-side arm current Inw, respectively. Arm currents Ipu, Inu, Ipv, Inv, Ipw, and Inw which flow from positive-side DC terminal Np toward negative-side DC terminal Nn are defined as positive currents.

[Configuration Example of Converter Cell]

(Configuration of Cell 1 Constituting Cell Groups 6a and 6b)

Figure 2:
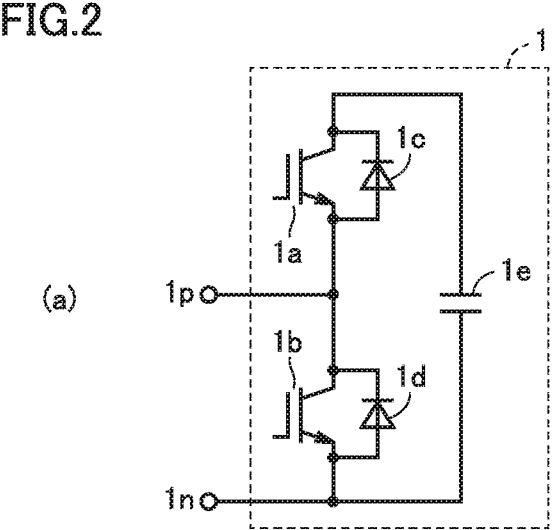
FIG. 2 is a circuit diagram showing one example of a converter cell 1 constituting one cell group 6a in an upper arm and one cell group 6b in a lower arm in FIG. 1.
Figure 2:
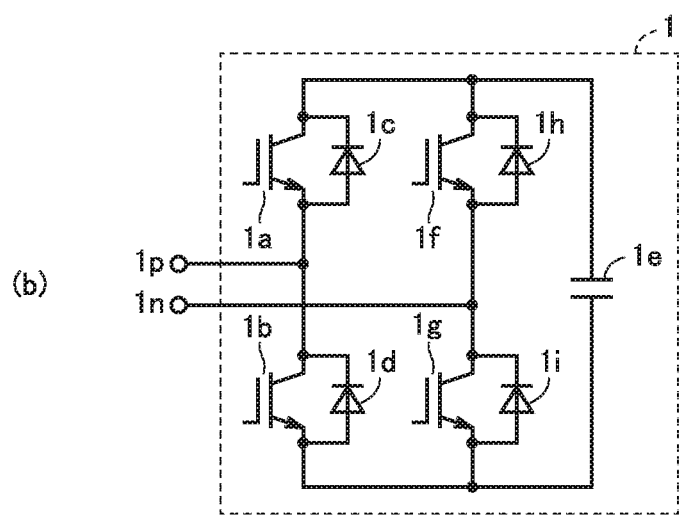
Figure 2:
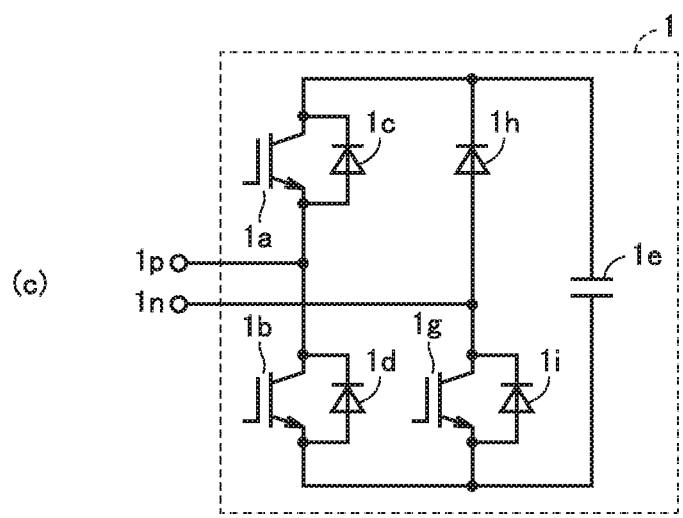

FIG. 2 is a circuit diagram showing one example of converter cell 1 constituting one cell group 6a in upper arm 13 and one cell group 6b in lower arm 14 in FIG. 1. Converter cell 1 shown in FIG. 2 (a) adopts a half bridge configuration and includes semiconductor switching elements 1a and 1b (which may hereinafter simply be referred to as a switching element) connected in series to each other, diodes 1c and 1d, and a DC capacitor 1e as an energy storage. Diodes 1c and 1d are connected in anti-parallel (in parallel and in a direction of a reverse bias) to switching elements 1a and 1b, respectively. DC capacitor 1e is connected in parallel to a series connection circuit of switching elements 1a and 1b and smoothes a DC voltage. A connection node between switching elements 1a and 1b is connected to a positive-side input and output terminal 1p and a connection node between switching element 1b and DC capacitor 1e is connected to a negative-side input and output terminal 1n.

In the configuration in FIG. 2 (a), switching elements 1a and 1b are controlled such that one is turned on and the other is turned off. When switching element 1a is turned on and switching element 1b is turned off, a voltage across opposing ends of DC capacitor 1e is applied across input and output terminals 1p and 1n (a positive-side voltage being applied to input and output terminal 1p and a negative-side voltage being applied to input and output terminal 1n). In contrast, when switching element 1a is turned off and switching element 1b is turned on, 0 V is applied across input and output terminals 1p and 1n. Converter cell 1 shown in FIG. 2 (a) can output a zero voltage or a positive voltage (dependent on a voltage of DC capacitor 1e) by alternately turning on switching elements 1a and 1b. Diodes 1c and 1d are provided for protection when voltages in reverse directions are applied to switching elements 1a and 1b.

Converter cell 1 shown in FIG. 2 (b) adopts a full bridge configuration and it is different from converter cell 1 in FIG. 2 (a) in further including switching elements 1g and 1f connected in series and diodes 1h and 1i connected in anti-parallel to switching elements 1g and 1f. Switching elements 1g and 1f as a whole are connected in parallel to the series connection circuit of switching elements 1a and 1b and connected in parallel to DC capacitor 1e. Input and output terminal 1p is connected to the connection node between switching elements 1a and 1b and input and output terminal 1n is connected to a connection node between switching elements 1g and 1f.

Converter cell 1 shown in FIG. 2 (b) is controlled such that switching element 1g is normally turned on, switching element 1f is normally turned off, and switching elements 1a and 1b are alternately turned on during a normal operation (that is, a zero voltage or a positive voltage is output across input and output terminals 1p and 1n). Converter cell 1 shown in FIG. 2 (b), however, can also output a zero voltage or a negative voltage by turning off switching element 1g, turning on switching element 1f, and alternately turning on switching elements 1a and 1b.

Converter cell 1 shown in FIG. 2 (c) is configured with switching element 1f having been removed from converter cell 1 of the full bridge configuration as shown in FIG. 2 (b) and it is otherwise the same as in FIG. 2 (b). Converter cell 1 in FIG. 2 (c) is controlled such that switching element 1g is normally turned on and switching elements 1a and 1b are alternately turned on during the normal operation (that is, a zero voltage or a positive voltage is output across input and output terminals 1p and 1n). Converter cell 1 shown in FIG. 2 (c) can output a negative voltage when switching elements 1a and 1g are turned off and switching element 1b is turned on so that a current flows from input and output terminal 1n toward input and output terminal 1p.

A self-turn-off switching element capable of control of both of an on operation and an off operation is employed for each of switching elements 1a, 1b, 1f, and 1g. For example, an insulated gate bipolar transistor (IGBT) or a gate commutated turn-off thyristor (GCT) is employed as switching elements 1a, 1b, 1f, and 1g.

(Configuration of Cell 20 Constituting Cell Groups 6c and 6d)

Figure 3:
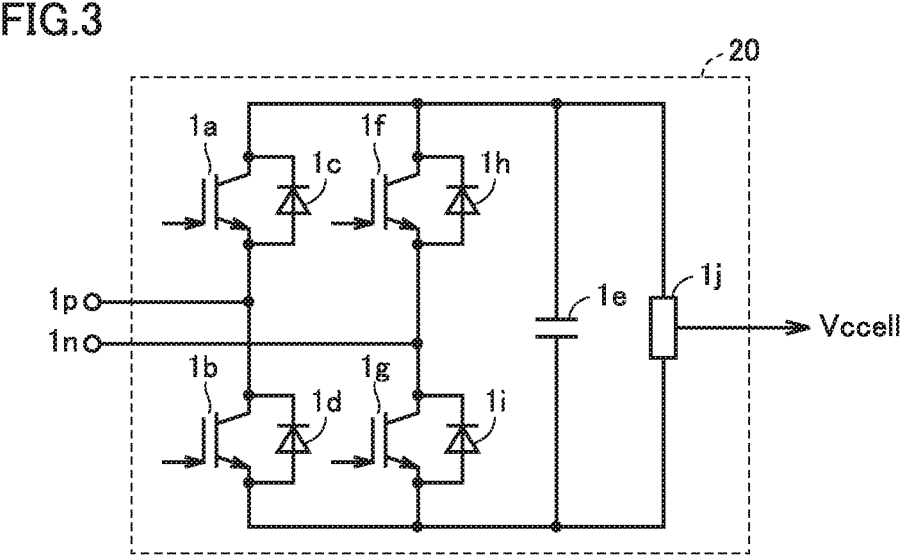
FIG. 3 is a circuit diagram showing a configuration of a converter cell 20 constituting the other cell group 6c in the upper arm and the other cell group 6d in the lower arm in FIG. 1.

FIG. 3 is a circuit diagram showing a configuration of converter cell 20 constituting the other cell group 6c in upper arm 13 and the other cell group 6d in lower arm 14 in FIG. 1. Converter cell 20 is configured to detect a voltage (a cell capacitor voltage Vccell) of DC capacitor 1e provided in the converter cell itself and to transmit a detection value to control device 5.

Specifically, converter cell 20 in FIG. 3 is different from converter cell 1 in FIG. 2 (b) in that it is based on converter cell 1 configured as a full bridge in FIG. 2 (b) and it further includes a DC voltage detector 1j in parallel to DC capacitor 1e. DC voltage detector 1j detects voltage Vccell of DC capacitor 1e and outputs detected cell capacitor voltage Vccell to control device 5. As will be described with reference to FIG. 4, in cell 20 in FIG. 3, switching elements 1a and 1b are used for control of a circulating current and not used for control for maintaining a voltage of DC capacitor 1e. In contrast, switching elements 1g and 1f are used for control of a voltage of DC capacitor 1e and not used for control of a circulating current.

[Configuration and General Operation of Control Device]

Figure 4:
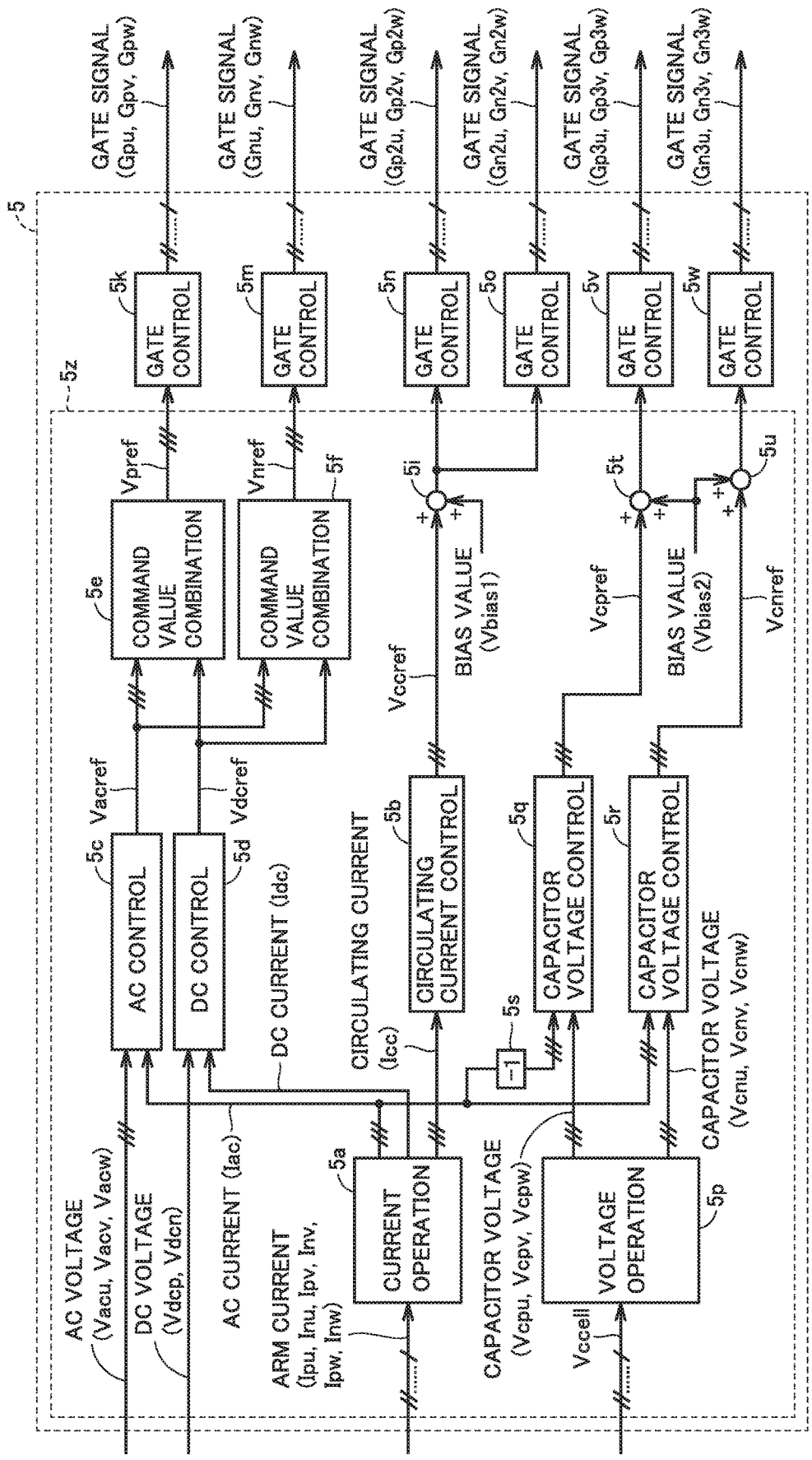
FIG. 4 is a configuration diagram of a control device 5 in FIG. 1.

FIG. 4 is a configuration diagram of control device 5 in FIG. 1. Control device 5 shown in FIG. 4 may be configured with a dedicated circuit or configured in part or in its entirety with a field programmable gate array (FPGA) and/or a microprocessor. A configuration of control device 5 and a general operation of each element will be described below with reference to FIGS. 1 and 4.

Control device 5 includes a voltage command value generation portion 5z and gate control portions 5k, 5m, 5n, 5o, 5v, and 5w. Gate control portions 5k and 5m correspond to positive-side cell group 6a and negative-side cell group 6b of leg circuit 8 of each phase, respectively. Gate control portion 5k generates gate signals Gpu, Gpv, and Gpw for controlling each switching element constituting positive-side cell group 6a of leg circuits 8a, 8b, and 8c. Gate control portion 5m generates gate signals Gnu, Gnv, and Gnw for controlling each switching element constituting negative-side cell group 6b of leg circuits 8a, 8b, and 8c.

Positive-side cell group 6c for control of a circulating current of leg circuit 8 of each phase corresponds to two gate control portions 5n and 5v and negative-side cell group 6d for control of a circulating current of leg circuit 8 of each phase corresponds to two gate control portions 5o and 5w. Specifically, gate control portion 5n generates gate signals Gp2u, Gp2v, and Gp2w for controlling switching elements 1a and 1b provided in each cell 20 in positive-side cell group 6c of leg circuits 8a, 8b, and 8c. Gate control portion 5o generates gate signals Gn2u, Gn2v, and Gn2w for controlling switching elements 1a and 1b provided in each cell 20 in negative-side cell group 6d of leg circuits 8a, 8b, and 8c. Gate control portion 5v generates gate signals Gp3u, Gp3v, and Gp3w for controlling switching elements 1g and 1f provided in each cell 20 in positive-side cell group 6c of leg circuits 8a, 8b, and 8c. Gate control portion 5w generates gate signals Gn3u, Gn3v, and Gn3w for controlling switching elements 1g and 1f provided in each cell 20 in negative-side cell group 6d of leg circuits 8a, 8b, and 8c.

Voltage command value generation portion 5z supplies voltage command values to gate control portions 5k, 5m, 5n, 5o, 5v, and 5w. Specifically, voltage command value generation portion 5z includes a current operation portion 5a, a circulating current control portion 5b, an AC control portion 5c, a DC control portion 5d, command value combination portions 5e and 5f, a voltage operation portion 5p, capacitor voltage control portions 5q and 5r, adders 5i, 5t, and 5u, and a gain circuit 5s.

Current operation portion 5a takes in positive-side arm currents Ipu, Ipv, and Ipw detected by current detector 9a provided in positive-side arm 13 of leg circuit 8 of each phase and negative-side arm currents Inu, Inv, and Inw detected by current detector 9b provided in negative-side arm 14 of leg circuit 8 of each phase. Current operation portion 5a operates AC current values Iacu, Iacv, and Iacw, a DC current value Idc, and circulating current values Iccu, Iccv, and Iccw from the arm current which has been taken in. Current operation portion 5a outputs calculated AC current values Iacu, Iacv, and Iacw to AC control portion 5c, outputs calculated DC current value Idc to DC control portion 5d, and outputs calculated circulating current values Iccu, Iccv, and Iccw to circulating current control portion 5b. Current operation portion 5a further outputs values calculated by multiplication of calculated AC current values Iacu, acv, and Iacw by −1 by gain circuit 5s to capacitor voltage control portion 5q and outputs calculated AC current values Iacu, Iacv, and Iacw to capacitor voltage control portion 5r.

U-phase AC current Iacu, V-phase AC current Iacv, and W-phase AC current Iacw (which are denoted as an AC current Iac when they are collectively referred to) which flow from AC terminals Nu, Nv, and Nw of each leg circuit 8 toward transformer 3 are defined as positive. DC current Idc which flows from DC circuit 4 toward positive-side DC terminal Np and from negative-side DC terminal Nn toward DC circuit 4 is defined as positive. Circulating currents Iccu, Iccv, and Iccw which flow through leg circuits 8a, 8b, and 8c, respectively (which are denoted as circulating current Icc when they are collectively referred to) from positive-side DC terminal Np toward negative-side DC terminal Nn are defined as positive.

AC voltage values Vacu, Vacv, and Vacw of the U phase, the V phase and the W phase (which are denoted as an AC voltage value Vac when they are collectively referred to) detected by AC voltage detector 10 are further input to AC control portion 5c. AC control portion 5c generates AC voltage command values Vacrefu, Vacrefv, and Vacrefw of the U phase, the V phase, and the W phase (which are denoted as an AC voltage command value Vacref when they are collectively referred to) based on input AC current value Iac and AC voltage value Vac.

DC voltage values Vdcp and Vdcn detected by DC voltage detectors 11a and 11b are further input to DC control portion 5d. DC control portion 5d generates a DC voltage command value Vdcref based on input DC voltage values Vdcp and Vdcn and DC current value Idc.

Command value combination portion 5e generates a voltage command value Vprefu for U-phase positive-side cell group 6a by combining U-phase AC voltage command value Vacrefu and DC voltage command value Vdcref with each other. Similarly, command value combination portion 5e generates a voltage command value Vprefv for V-phase positive-side cell group 6a by combining V-phase AC voltage command value Vacrefv and DC voltage command value Vdcref with each other. Command value combination portion 5e further generates a voltage command value Vprefw for W-phase positive-side cell group 6a by combining W-phase AC voltage command value Vacrefw and DC voltage command value Vdcref with each other. Generated voltage command values Vprefu, Vprefv, and Vprefw (which are denoted as voltage command value Vpref when they are collectively referred to or an unspecified voltage command value is referred to) is input to gate control portion 5k.

Command value combination portion 5f generates a voltage command value Vnrefu for U-phase negative-side cell group 6b by combining U-phase AC voltage command value Vacrefu and DC voltage command value Vdcref with each other. Similarly, command value combination portion 5f generates a voltage command value Vnrefv for V-phase negative-side cell group 6b by combining V-phase AC voltage command value Vacrefv and DC voltage command value Vdcref with each other. Command value combination portion 5f further generates a voltage command value Vnrefw for W-phase negative-side cell group 6b by combining W-phase AC voltage command value Vacrefw and DC voltage command value Vdcref with each other. Generated voltage command values Vnrefu, Vnrefv, and Vnrefw (which are denoted as voltage command value Vnref when they are collectively referred to or an unspecified voltage command value is referred to) are input to gate control portion 5m.

Circulating current control portion 5b generates voltage command values Vccrefu, Vccrefv, and Vccrefw (which are denoted as a voltage command value Vccref when they are collectively referred to or an unspecified voltage command value is referred to) for control of a circulating current of each phase based on respective circulating current values Iccu, Iccv, and Iccw. Generated voltage command value Vccref for control of a circulating current of each phase is input to gate control portions 5n and 5o after a bias value Vbias1 is added thereto by adder 5i.

Voltage operation portion 5p receives information on cell capacitor voltage Vccell from each cell 20 provided in cell groups 6c and 6d of leg circuits 8a, 8b, and 8c of respective phases shown in FIG. 1. Voltage operation portion 5p calculates a representative value Vcp (Vcpu of the U phase, Vcpv of the V phase, and Vcpw of the W phase) of a plurality of cell capacitor voltages of positive-side cell group 6c and a representative value Vcn (Vcnu of the U phase, Vcnv of the V phase, and Vcnw of the W phase) of a plurality of cell capacitor voltages of negative-side cell group 6d for each phase of the U phase, the V-phase, and the W phase based on received information on cell capacitor voltage Vccell. An average value, a median, a maximum value, or the minimum value of cell capacitor voltage Vccell of each cell group can be applied as appropriate to operation of the representative value. Voltage operation portion 5p outputs representative values Vcpu, Vcpv, and Vcpw of the cell capacitor voltages of each positive-side cell group 6c to capacitor voltage control portion 5q and outputs representative values Vcnu, Vcnv, and Vcnw of the cell capacitor voltages of each negative-side cell group 6d to capacitor voltage control portion 5r.

Capacitor voltage control portion 5q receives information on cell capacitor voltage values Vcpu, Vcpv, and Vcpw of positive-side cell group 6c from voltage operation portion 5p and receives information on an AC current value (−Iacu, −Iacv, and −Iacw) opposite in phase (that is, multiplied by −1) from current operation portion 5a. Capacitor voltage control portion 5q generates a voltage command value Vcpref (Vcprefu for the U phase, Vcprefv for the V phase, and Vcprefw for the W phase) for controlling a capacitor voltage of each cell 20 in positive-side cell group 6c based on the received information. Generated voltage Vcpref is input to gate control portion 5v after a bias value Vbias2 is added thereto by adder 5t.

Capacitor voltage control portion 5r receives information on cell capacitor voltage values Vcnu, Vcnv, and Vcnw of negative-side cell group 6d from voltage operation portion 5p and receives information on AC current values Iacu, Iacv, and Iacw from current operation portion 5a. Capacitor voltage control portion 5r generates a voltage command value Vcnref (Vcnrefu for the U phase, Vcnrefv for the V phase, and Vcnrefw for the W phase) for controlling a capacitor voltage of each cell 20 in negative-side cell group 6d based on the received information. Generated voltage Vcnref is input to gate control portion 5w after bias value Vbias2 is added thereto by adder 5u.

[Detailed Operation of Control Device 5]

A detailed operation of control device 5 will now be described.

(Operation of Current Operation Portion 5a)

Referring to FIG. 1, a point of connection between positive-side arm 13 and negative-side arm 14 of leg circuit 8a of the U phase is AC terminal Nu, which is connected to transformer 3. Therefore, AC current Iacu which flows from AC terminal Nu toward transformer 3 is equal to a current value calculated by subtracting a value of a current Inu which flows through negative-side arm 14 measured with current detector 9b from a value of current Ipu which flows through positive-side arm 13 measured with current detector 9a, that is, $$Iacu = Ipu - Inu \qquad (1).$$

An average value of current Ipu which flows through positive-side arm 13 and current Inu which flows through negative-side arm 14 is defined as a common current Icomu which flows through both of arms 13 and 14. Common current Icomu is a leg current which flows through a DC terminal of leg circuit 8a. Leg current Icomu can be operated as $$Icomu = (Ipu + Inu)/2 \qquad (2).$$

Similarly for the V phase and the W phase, V-phase AC current Iacv and a V-phase leg current Icomv can be calculated with V-phase positive-side arm current Ipv and V-phase negative-side arm current Inv, and W-phase AC current Iacw and a W-phase leg current Icomw can be calculated with W-phase positive-side arm current Ipw and W-phase negative-side arm current Inw. Specifically, they are expressed in expressions below.

$$Iacv = Ipv - Inv \qquad (3)$$

$$Icomv = (Ipv + Inv)/2 \qquad (4)$$

$$Iacw = Ipw - Inw \qquad (5)$$

$$Icomw = (Ipw + Inw)/2 \qquad (6)$$

DC terminals on the positive side of leg circuits 8a, 8b, and 8c of respective phases are connected in common as positive-side DC terminal Np, and DC terminals on the negative side are connected in common as negative-side DC terminal Nn. According to this configuration, a current value calculated by adding leg currents Icomu, Icomv, and Icomw of respective phases results in DC current Idc which flows in from the positive-side terminal of DC circuit 4 and returns to DC circuit 4 through the negative-side terminal. Therefore, DC current Idc can be operated as $$Idc = Icomu + Icomv + Icomw \qquad (7).$$

Uniform allocation of a DC current component contained in the leg current among the phases is appropriate because a current capacity of the cell can be uniform. Taking into account this fact, a difference between a leg current and ⅓ of a DC current value can be operated as a value of a circulating current which does not flow in DC circuit 4 but flows through the legs of the respective phases. Specifically, circulating currents Iccu, Iccv, and Iccw of the U phase, the V phase, and the W phase can be operated as $$Iccu = Icomu - Idc/3 \qquad (8)$$

$$Iccv = Icomv - Idc/3 \qquad (9)$$

$$Iccw = Icomw - Idc/3 \qquad (10).$$

Current operation portion 5a in FIG. 4 operates AC current values Iacu, Iacv, and Iacw, DC current value Idc, and circulating current values Iccu, Iccv, and Iccw from arm current values Ipu, Inu, Ipv, Inv, Ipw, and Inw detected by current detectors 9a and 9b in accordance with the expressions (1) to (10). Current operation portion 5a outputs calculated AC current values Iacu, Iacv, and Iacw to AC control portion 5c, gain circuit 5s, and capacitor voltage control portion 5r. An AC current value (−Iacu, −Iacv, and −Iacw) opposite in polarity obtained by multiplication by −1 by gain circuit 5s is input to capacitor voltage control portion 5q. Current operation portion 5a outputs DC current value Idc and circulating current values Iccu, Iccv, and Iccw to DC control portion 5d and circulating current control portion 5b, respectively.

(Operation of AC Control Portion 5c)

AC control portion 5c outputs an AC voltage to be output from each converter cell 1 implementing the power conversion device as AC voltage command values Vacrefu, Vacrefv, and Vacrefw, based on AC voltage values Vacu, Vacv, and Vacw detected by AC voltage detector 10 and AC current values Iacu, Iacv, and Iacw output from current operation portion 5a.

In AC control portion 5c, for example, an AC current compensator which carries out feedback control such that an AC current value matches with an AC current command value and/or an AC voltage compensator which carries out feedback control such that an AC voltage value matches with an AC voltage command value is/are configured in accordance with a function required in the power conversion device. Alternatively, a power compensator which calculates power based on an AC current value and an AC voltage value and subjects power to feedback control such that a value thereof attains to a desired value is implemented. In actual, one of the AC current compensator, the AC voltage compensator, and the power compensator or a plurality of them as combined implement(s) AC control portion 5c for operation.

Since the AC current compensator controls a current output to AC circuit 2 with transformer 3 being interposed, a voltage component for controlling the current is a component which has been known as a normal-phase component and a reverse-phase component of a multi-phase AC voltage or a normal mode component. The AC voltage compensator also similarly outputs a normal-phase component and a reverse-phase component to AC circuit 2 with transformer 3 being interposed.

When an AC multi-phase voltage is output to AC circuit 2, output of a voltage component in common among the three phases which is known as a zero-phase component or a common mode component to AC circuit 2 in addition to these normal-phase and reverse-phase components is also required. For example, it has been known that an AC component of a fundamental wave which can be output from a converter cell can be increased by approximately 15% by superimposing a third-order harmonic of the fundamental wave on a zero-phase component.

An effect below is further obtained by outputting a certain zero-phase component. Specifically, in the power conversion device configured in FIG. 1, an AC voltage component output from positive-side cell group 6a and an AC voltage component output from negative-side cell group 6b are opposite in polarity to each other and a DC voltage component output from positive-side cell group 6a and a DC voltage component output from negative-side cell group 6b are identical in polarity to each other as will be described later. Therefore, when a certain zero-phase component is contained in the AC voltage component, the zero-phase component is superimposed in a direction reverse in terms of positive and negative on the DC voltage component output from positive-side cell group 6a and the DC voltage component output from negative-side cell group 6b. Consequently, a difference between DC power output from positive-side cell group 6a and DC power output from negative-side cell group 6b is produced, and therefore energy stored in DC capacitor 1e contained in each converter cell 1 can be exchanged between positive-side cell group 6a and negative-side cell group 6b. A voltage value of DC capacitor 1e of each cell constituting positive-side cell group 6a can thus be balanced with a voltage value of DC capacitor 1e of each cell constituting negative-side cell group 6b, and the zero-phase voltage can be used for such control of balance.

(Operation of DC Control Portion 5d)

DC control portion 5d operates a voltage value Vdc across DC terminals based on a differential voltage between DC voltage values Vdcp and Vdcn detected by DC voltage detectors 11a and 11b. Voltage value Vdc across the DC terminals is given as $$Vdc = Vdcp - Vdcn \qquad (11).$$

DC control portion 5d generates as DC voltage command value Vdcref, a DC voltage to be output from cell 1 based on calculated voltage value Vdc across the DC terminals and DC current value Idc output from current operation portion 5a, and outputs the DC voltage command value.

DC control portion 5d is implemented, for example, by any one of a DC current compensator which controls a DC current value, a DC voltage compensator which controls a DC voltage, and a DC power compensator which controls DC power, or a plurality of them as being combined for operation, similarly to AC control portion 5c. A DC voltage component output from positive-side cell group 6a and a DC voltage component output from negative-side cell group 6b in accordance with DC voltage command value Vdcref output from the DC voltage compensator, the DC current compensator, and the DC power compensator are identical in polarity to each other as will be described later. Since cell groups 6a and 6b are connected in series, output voltages from cell groups 6a and 6b are combined and the combined voltage is defined as a voltage component generated across the positive-side DC terminal and the negative-side DC terminal of leg circuit 8. Since DC voltage command value Vdcref is provided to gate control portions 5k and 5m as a component common among the phases in the configuration of control device 5 shown in FIG. 4, the voltage components output from cell groups 6a and 6b in accordance with DC voltage command value Vdcref result in a DC voltage component output to DC circuit 4.

Unlike the above, DC control portion 5d can also be configured to provide DC voltage command values Vdcref different in magnitude among the phases. In that case, a DC voltage command value is provided such that a circulating current which circulates among the phases flows based on a potential difference produced in reactors 7a and 7b. When a circulating current flows in a DC manner, a difference is produced in DC power generated by leg circuits 8a, 8b, and 8c and consequently a difference in energy stored in DC capacitor 1e constituting cell groups 6a and 6b is also produced among the phases. This operation is applied to balance control for balancing among the phases in connection with a DC voltage of DC capacitor 1e.

(Operation of Command Value Combination Portions 5e and 5f)

Command value combination portion 5e operates a voltage to be output from positive-side cell group 6a as voltage command value Vpref (Vprefu, Vprefv, and Vprefw). Command value combination portion 5f operates a voltage to be output from negative-side cell group 6b as voltage command value Vnref (Vnrefu, Vnrefv, and Vnrefw). Voltage command values Vpref and Vnref are obtained by combining DC voltage command value Vdcref and AC voltage command value Vacref with each other for each phase.

Specifically, positive-side cell group 6a and negative-side cell group 6b are connected in series between DC terminals Np and Nn connected to DC circuit 4. Therefore, in calculating each of voltage command value Vpref of positive-side cell group 6a and voltage command value Vnref of negative-side cell group 6b, ½ of DC voltage command value Vdcref is combined by addition.

Since AC terminals Nu, Nv, and Nw are located at points of connection between positive-side arm 13 and negative-side arm 14, AC voltage command value Vacref is combined by subtraction in calculating voltage command value Vpref of positive-side cell group 6a, and AC voltage command value Vacref is combined by addition in calculating voltage command value Vnref of negative-side cell group 6b. For example, in leg circuit 8a in FIG. 1, when positive-side cell group 6a outputs an AC voltage relatively small in value and negative-side cell group 6b outputs an AC voltage relatively great in value, a potential of AC terminal Nu is closer to a potential of positive-side DC terminal Np and a high voltage is output to AC terminal Nu. Negative-side cell group 6b outputs an AC voltage identical in polarity to an AC voltage to be output from AC terminal Nu, and positive-side cell group 6a outputs an AC voltage opposite in polarity to an AC voltage to be output from AC terminal Nu.

In the power conversion device in the first embodiment, command value combination portions 5e and 5f combine normal- and reverse-phase components and a zero-phase component contained in AC voltage command value Vacref with DC voltage command value Vdcref through the operation above, however, they do not combine a voltage component with which energy is balanced among the phases by feeding a circulating current nor a voltage component with which a circulating current is controlled.

(Operation of Gate Control Portions 5k and 5m)

Gate control portion 5k provides corresponding gate signals Gpu, Gpv, and Gpw to the switching element of cell 1 constituting positive-side cell group 6a of each phase based on voltage command values Vprefu, Vprefv, and Vprefw of the U phase, the V phase, and the W phase combined by command value combination portion 5e. Gate control portion 5m provides corresponding gate signals Gnu, Gnv, and Gnw to the switching element of cell 1 constituting negative-side cell group 6b of each phase based on voltage command values Vnrefu, Vnrefv, and Vnrefw of the U phase, the V phase, and the W phase combined by command value combination portion 5f.

As described already, in half bridge cell 1 shown in FIG. 2 (a), switching element 1a is turned on and switching element 1b is turned off when a voltage of DC capacitor 1e is output. When a zero voltage is output, in contrast, switching element 1a is turned off and switching element 1b is turned on. A pulse width modulation (PWM) scheme has thus been known as a scheme for controlling a converter which can output a binary voltage level.

Under the pulse width modulation scheme, a pulse width of a gate signal supplied to a switching element is controlled such that a DC component of a desired voltage or an AC component of a fundamental wave can be output in a time average manner. By making pulses from a plurality of converters different in timing, a voltage less in harmonic component can be supplied as a combined voltage. For example, a method of determining timing of switching at a point of intersection between signals based on comparison of a triangular wave or a saw tooth wave of a fixed frequency with a voltage command value has been known.

(Operation of Circulating Current Control Portion 5b)

Circulating current values Iccu, Iccv, and Iccw of the U phase, the V phase, and the W phase operated by current operation portion 5a are sent to circulating current control portion 5b. Circulating current control portion 5b subjects the circulating current value to feedback control such that the circulating current value matches with a circulating current command value. Circulating current control portion 5b is provided with a compensator which amplifies a difference between a circulating current command value and a circulating current value. Though a zero current is normally provided as a circulating current command value, a non-zero value may also be provided when imbalance occurs in a power system. Circulating current control portion 5b outputs a voltage component to be output by cell groups 6c and 6d for control of a circulating current as voltage command value Vccref (Vccrefu for the U phase, Vccrefv for the V phase, and Vccrefw for the W phase).

The circulating current flows through legs of different phases. Cell groups 6a and 6b and reactors 7a and 7b are present in a path for the circulating current and a circulating current is produced by application of a potential difference produced by switching of cell groups 6a and 6b to reactors 7a and 7b. Therefore, a circulating current is suppressed by application of a voltage opposite in polarity to the reactors by cell groups 6c and 6d provided in the same path.

For example, when circulating current Iccu flows from the positive-side DC terminal toward the negative-side DC terminal of leg circuit 8a and when a positive voltage is output from each of cell groups 6c and 6d of leg circuit 8a, a voltage in a direction of lowering in circulating current is applied to reactors 7a and 7b. When a current flows in a direction reverse to the above, a circulating current can be attenuated by applying a voltage from cell groups 6c and 6d also in the reverse direction. Therefore, circulating current control portion 5b carries out feedback control by using a compensator which amplifies a difference between the circulating current command value and the circulating current value.

(Operations of Adder 5i and Gate Control Portions 5n and 5o)

Adder 5i adds bias value Vbias1 to voltage command value Vccref output from circulating current control portion 5b and outputs a result of addition to gate control portions 5n and 5o. Gate control portions 5n and 5o output gate signals for control of switching of switching elements 1a and 1b provided in each cell 20 in cell groups 6c and 6d in accordance with a result of addition of voltage command value Vccref and bias value Vbias1. Gate control portions 5n and 5o can be operated under the pulse width modulation scheme similarly to gate control portions 5k and 5m.

Circulating current Icc is a bipolar signal having positive and negative values. Therefore, voltage command value Vccref output from circulating current control portion 5b is also a bipolar signal. In this case, a conduction ratio (a duty) of switching elements 1a and 1b is desirably 50% when voltage command value Vccref is 0. In order to realize this operation, adder 5$i$ adds bias value Vbias1 to voltage command value Vccref.

Circulating current Icc is identical in value between positive-side cell group 6$c$ and negative-side cell group 6$d$. Therefore, common voltage command value Vccref is given to gate control portions 5$n$ and 5$o$.

(Voltage Operation Portion 5$p$)

As described already, voltage operation portion 5$p$ outputs capacitor voltage Vcp (Vcpu of the U phase, Vcpv of the V phase, and Vcpw of the W-phase) to capacitor voltage control portion 5$q$ as a representative value of cell capacitor voltage Vccell received from positive-side cell group 6$c$ of each leg circuit 8. Voltage operation portion 5$p$ outputs capacitor voltage Vcn (Vcnu of the U phase, Vcnv of the V phase, and Vcnw of the W phase) to capacitor voltage control portion 5$r$ as a representative value of cell capacitor voltage Vccell received from negative-side cell group 6$d$ of each leg circuit 8.

(Operations of Capacitor Voltage Control Portions 5$q$ and 5$r$)

Since voltages output from cell groups 6$c$ and 6$d$ in accordance with voltage command value Vccref described above have a function to control a current which flows through reactors 7$a$ and 7$b$, output power from cell groups 6$c$ and 6$d$ is substantially reactive power. When active power resulting from a loss in reactors 7$a$ and 7$b$ is unignorable, however, reactive power generated in cell groups 6$c$ and 6$d$ should be adjusted because the capacitor voltage may be varied by charging and discharging of DC capacitor 1$e$ provided in cell groups 6$c$ and 6$d$ (in the power conversion device configured in FIG. 1, a capacitor voltage is normally controlled to be constant).

From a point of view above, capacitor voltage control portion 5$q$ in FIG. 4 carries out feedback control such that a capacitor voltage command value matches with capacitor voltage value Vcp. Specifically, capacitor voltage control portion 5$q$ is provided with a compensator which amplifies a difference between a capacitor voltage command value and capacitor voltage value Vcp (a value calculated by subtracting capacitor voltage value Vcp from a capacitor voltage command value) and a multiplier which multiplies the difference amplified by the compensator by an AC current (−Iac) opposite in polarity input from gain circuit 5$s$. A result of multiplication is output as voltage command value Vcpref.

It is assumed that a voltage of DC capacitor 1$e$ is varied and a difference is produced between a capacitor voltage command value and capacitor voltage value Vcp. Initially, (i) when the difference is positive (the capacitor voltage command value is greater than capacitor voltage value Vcp), capacitor voltage control portion 5$q$ outputs voltage command value Vcpref opposite in phase to AC current value Iac. Since switching elements 1$f$ and 1$g$ provided in cell 20 in cell group 6$c$ are controlled in accordance with voltage command value Vcpref, discharging power decreases and charging power increases. For example, when a current flows in a direction from input and output terminal 1$p$ in FIG. 3 to input and output terminal 1$n$, a conduction ratio of switching element 1$g$ increases, and when a current flows in a direction from input and output terminal 1$n$ to input and output terminal 1$p$, a conduction ratio of switching element 1$f$ increases. Consequently, a voltage of DC capacitor 1$e$ increases (that is, voltage value Vcp of the DC capacitor increases). Finally, capacitor voltage value Vcp matches with the capacitor voltage command value.

(ii) When the difference is negative (the capacitor voltage command value is smaller than capacitor voltage value Vcp), capacitor voltage control portion 5$q$ outputs voltage command value Vcpref in phase with AC current value Iac. Since switching elements 1$f$ and 1$g$ of cell 20 in cell group 6$c$ are controlled in accordance with voltage command value Vcpref, discharging power increases and charging power decreases. For example, when a current flows in a direction from input and output terminal 1$p$ in FIG. 3 to input and output terminal 1$n$, a conduction ratio of switching element 1$f$ increases, and when a current flows in a direction from input and output terminal 1$n$ to input and output terminal 1$p$, a conduction ratio of switching element 1$g$ increases. Consequently, a voltage of DC capacitor 1$e$ decreases (that is, voltage value Vcp of the DC capacitor decreases). Finally, capacitor voltage value Vcp matches with the capacitor voltage command value.

Similarly, capacitor voltage control portion 5$r$ in FIG. 4 is provided with a compensator which amplifies a difference between a capacitor voltage command value and capacitor voltage value Vcn (a value calculated by subtracting capacitor voltage value Vcn from the capacitor voltage command value) and a multiplier which multiplies the amplified difference by AC current Iac. A result of multiplication is output as voltage command value Vcnref. Since an AC current (−Iac) opposite in phase to positive-side cell group 6$c$ flows through negative-side cell group 6$d$, for negative-side cell group 6$d$, multiplication by −1 by gain circuit 5$s$ for reversing the polarity of AC current Iac is not required. Since an operation for control of capacitor voltage Vcn of cell group 6$d$ is the same as that of cell group 6$c$, description will not be repeated.

(Operations of Adders 5$t$ and 5$u$ and Gate Control Portions 5$v$ and 5$w$)

Adder 5$t$ adds bias value Vbias2 to voltage command value Vcpref output from capacitor voltage control portion 5$q$ and outputs a result of addition to gate control portion 5$v$. Gate control portion 5$v$ outputs a gate signal for controlling switching of switching elements 1$f$ and 1$g$ provided in each cell 20 in cell group 6$c$ in accordance with a result of addition of voltage command value Vcpref and bias value Vbias2. Gate control portion 5$v$ can operate under the pulse width modulation scheme similarly to gate control portions 5$k$ and 5$m$.

Similarly, adder 5$u$ adds bias value Vbias2 to voltage command value Vcnref output from capacitor voltage control portion 5$r$ and outputs a result of addition to gate control portion 5$w$. Gate control portion 5$w$ outputs a gate signal for controlling switching of switching elements 1$f$ and 1$g$ provided in each cell 20 in cell group 6$d$ in accordance with a result of addition of voltage command value Vcnref and bias value Vbias2. Gate control portion 5$w$ can operate under the pulse width modulation scheme similarly to gate control portions 5$k$ and 5$m$.

With bias value Vbias2 being set to a value the same as bias value Vbias1, in the full bridge configuration as in cell 20 shown in FIG. 3, switching elements 1$a$, 1$b$, 1$f$, and 1$g$ are equal in conduction ratio when a circulating current is 0. Consequently, a time average value of an output voltage across input and output terminals 1$p$ and 1$n$ is zero and DC capacitor 1$e$ is not charged or does not discharge even when a current is fed. Since a voltage output from cell 20 in accordance with voltage command value Vccref output from circulating current control portion 5$b$ is applied to reactors 7 and 7$b$, a reactive power component becomes a main component. Therefore, a voltage of DC capacitor 1$e$ can efficiently be controlled by adjusting charging or discharging power from an equilibrium state corresponding to bias value Vbias2 in accordance with voltage command values Vcpref and Vcnref output from respective capacitor voltage control portions 5q and 5r.

Effect of First Embodiment

As set forth above, the power conversion device according to the first embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device. With cell groups 6a and 6b, an electric quantity of each of AC terminals Nu, Nv, and Nw and DC terminals Np and Nn can reliably be controlled without interference by control of a circulating current.

Furthermore, the power conversion device according to the first embodiment can control a value of a circulating current in accordance with a circulating current command value by including cell groups 6c and 6d for control of a circulating current. Each cell 20 constituting cell groups 6c and 6d includes dedicated switching elements 1a and 1b for control of a circulating current and dedicated switching elements 1f and 1g which control a difference between a voltage value of DC capacitor 1e and a command value thereof to zero. In other words, switching elements 1a and 1b are not used for control of a voltage value of DC capacitor 1e and switching elements 1f and 1g are not used for control of a circulating current. Since a capacitor voltage of each cell 20 in cell groups 6c and 6d for control of a circulating current can thus be maintained at a constant value, control of a circulating current can be controlled in a stable manner and independently of maintaining of a capacitor voltage.

[Modification]

In each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portions 5n and 5v, adder 5t, gain circuit 5s, and capacitor voltage control portion 5q associated therewith are not required either, which is advantageous in simplification of the configuration of control device 5. Similarly, when only reactor 7a on the positive side is provided, negative-side cell group 6d for control of a circulating current is not required and gate control portions 5o and 5w, adder 5u, and capacitor voltage control portion 5r associated therewith are not required either, which is advantageous in simplification of the configuration of control device 5.

In the first embodiment, description has been given assuming that cell group 6a and cell group 6b not for control of a circulating current are configured with identical cells 1, however, each cell in cell group 6a and each cell in cell group 6b may be different from each other in configuration. An effect the same as in the first embodiment described above is achieved also in this case.

An example in which an output from a compensator is multiplied by AC current value Iac or an AC current value (−Iac) opposite in polarity in capacitor voltage control portions 5q and 5r is shown in the embodiment above. In contrast, in feedback control in AC control portion 5c based on a difference between an AC current command value and AC current value Iac, the same effect is achieved also with the use of an AC current command value instead of AC current value Iac. Instead of AC current value Iac, a polarity thereof may be used, and instead of the AC current command value, a polarity thereof may be used. The same effect is achieved in any case.

Second Embodiment

Though a power conversion device in a second embodiment is the same as the first embodiment shown in FIG. 1 in overall configuration, control device 5 is different in part from FIG. 4 in the first embodiment in configuration and operations. Specific description will be given below with reference to FIGS. 1 and 5.

[Configuration of Control Device 5]

Figure 5:
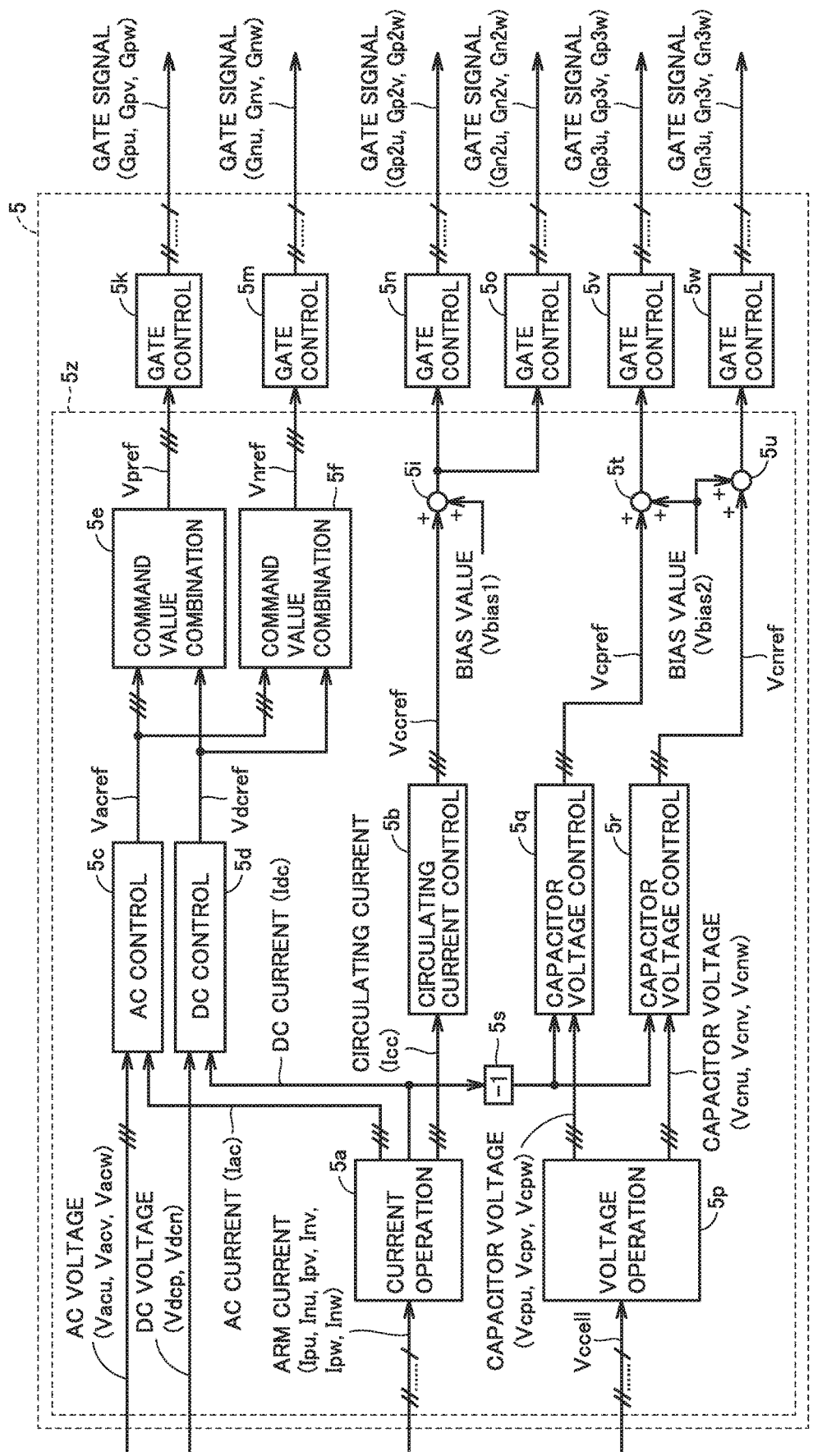
FIG. 5 is a configuration diagram of control device 5 included in the power conversion device according to a second embodiment.

FIG. 5 is a configuration diagram of control device 5 included in the power conversion device according to the second embodiment. Control device 5 in FIG. 5 is different from control device 5 in FIG. 4 in input signals to capacitor voltage control portions 5q and 5r. Specifically, capacitor voltage control portion 5q in FIG. 5 receives capacitor voltage Vcp (Vcpu of the U phase, Vcpv of the V phase, and Vcpw of the W phase) output from voltage operation portion 5p and DC current value Idc multiplied by −1 by gain circuit 5s, that is, a DC current value (−Idc) opposite in polarity. Capacitor voltage control portion 5r in FIG. 5 receives capacitor voltage Vcn (Vcnu of the U phase, Vcnv of the V phase, and Vcnw of the W phase) output from voltage operation portion 5p and DC current value Idc multiplied by −1 by gain circuit 5s, that is, a DC current value (−Idc) opposite in polarity. Since FIG. 5 is otherwise the same in configuration as FIG. 4, the same or corresponding elements have the same reference characters allotted and description will not be repeated.

[Operation of Control Device 5]

An operation of control device 5 in FIG. 5 will now be described. Description of an operation in common to that in FIG. 4 of the first embodiment will not be repeated.

Capacitor voltage control portion 5q in FIG. 5 carries out feedback control such that a capacitor voltage command value matches with capacitor voltage Vcp. Specifically, capacitor voltage control portion 5q is provided with a compensator which amplifies a difference between the capacitor voltage command value and capacitor voltage value Vcp (a value calculated by subtracting capacitor voltage value Vcp from the capacitor voltage command value) and a multiplier which multiplies the difference amplified by the compensator by a DC current (−Idc) opposite in polarity given from gain circuit 5s for each phase. A result of multiplication is output as voltage command value Vcpref.

(i) When the difference is positive (that is, the capacitor voltage command value is greater than capacitor voltage value Vcp) and DC current Idc is positive, capacitor voltage control portion 5q outputs negative voltage command value Vcpref. Switching elements 1f and 1g provided in cell 20 in positive-side cell group 6c are controlled in accordance with a value calculated by adding bias value Vbias2 to negative voltage command value Vcpref. When switching elements 1a and 1b and switching elements 1f and 1g are controlled to be equal in conduction ratio, the output voltage from cell 20 is in an equilibrium state in which the output voltage is zero. A conduction ratio of switching element 1g, however, is increased owing to a component of negative voltage command value Vcpref output from capacitor voltage control portion 5q. Consequently, as a result of interaction with DC current Idc, discharging power decreases (charging power increases) and hence a voltage of DC capacitor 1e increases (that is, voltage value Vcp of the DC capacitor increases). Finally, capacitor voltage value Vcp matches with the capacitor voltage command value.

(ii) When the difference is negative (the capacitor voltage command value is smaller than capacitor voltage value Vcp) and DC current Idc is positive, capacitor voltage control portion 5q outputs positive voltage command value Vcpref. Switching elements 1f and 1g provided in positive-side cell 20 in cell group 6c are controlled in accordance with a value calculated by adding bias value Vbias2 to positive voltage command value Vcpref. A conduction ratio of switching element 1f increases owing to a component of positive voltage command value Vcpref output from capacitor voltage control portion 5q. Consequently, as a result of interaction with DC current Idc, discharging power increases (charging power decreases) and hence a voltage of DC capacitor 1e lowers (that is, voltage value Vcp of the DC capacitor decreases). Finally, capacitor voltage value Vcp matches with the capacitor voltage command value.

Similarly, capacitor voltage control portion 5r carries out feedback control such that the capacitor voltage command value matches with capacitor voltage Vcn. Specifically, capacitor voltage control portion 5r is provided with a compensator which amplifies a difference between the capacitor voltage command value and capacitor voltage value Vcn (a value calculated by subtracting capacitor voltage value Vcn from the capacitor voltage command value) and a multiplier which multiplies the difference amplified by the compensator by a DC current (−Idc) opposite in polarity given from gain circuit 5s for each phase. A result of multiplication is output as voltage command value Vcnref. Switching elements 1f and 1g provided in cell 20 in negative-side cell group 6d are controlled in accordance with a value obtained by addition of bias value Vbias2 to voltage command value Vcnref. Since an operation to control capacitor voltage Vcn of cell group 6d is the same as in the example of cell group 6c, description will not be repeated.

Effect of Second Embodiment

As set forth above, the power conversion device according to the second embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device as in the first embodiment. With cell groups 6a and 6b, an electric quantity of each of AC terminals Nu, Nv, and Nw and DC terminals Np and Nn can reliably be controlled without interference by control of a circulating current.

Furthermore, the power conversion device according to the second embodiment can control a value of a circulating current in accordance with a circulating current command value by including cell groups 6c and 6d for control of a circulating current as in the first embodiment. Each cell 20 constituting cell groups 6c and 6d includes dedicated switching elements 1a and 1b for control of a circulating current and dedicated switching elements 1f and 1g which control a difference between a voltage value of DC capacitor 1e and a command value thereof to zero. Since a capacitor voltage of each cell 20 in cell groups 6c and 6d for control of a circulating current can thus be maintained at a constant value, control of a circulating current can be controlled in a stable manner and independently of maintaining of a capacitor voltage.

[Modification]

In each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portions 5n and 5v, adder 5t, and capacitor voltage control portion 5q associated therewith are not required either, which is advantageous in simplification of the configuration of control device 5. Similarly, when only reactor 7a on the positive side is provided, negative-side cell group 6d for control of a circulating current is not required and gate control portions 5o and 5w, adder 5u, and capacitor voltage control portion 5r associated therewith are not required either, which is advantageous in simplification of the configuration of control device 5.

In the second embodiment, description has been given assuming that cell group 6a and cell group 6b not for control of a circulating current are configured with identical cells 1, however, each cell in cell group 6a and each cell in cell group 6b may be different from each other in configuration. An effect the same as in the second embodiment described above is achieved also in this case.

An example in which an output from the compensator is multiplied by a DC current value (−Idc) opposite in polarity in capacitor voltage control portions 5q and 5r is shown in the embodiment above. In contrast, in feedback control in DC control portion 5d based on a difference between a DC current command value and DC current value Idc, the same effect is achieved also with the use of a DC current command value instead of DC current value Idc. Instead of DC current value Idc, a polarity thereof may be used, and instead of the DC current command value, a polarity thereof may be used. The same effect is achieved in any case.

Third Embodiment

Though a power conversion device in a third embodiment is the same as the first embodiment shown in FIG. 1 in overall configuration, control device 5 is different in part from FIG. 4 in the first embodiment in configuration and operations. Specific description will be given below with reference to FIGS. 1 and 6.

[Configuration of Control Device 5]

Figure 6:
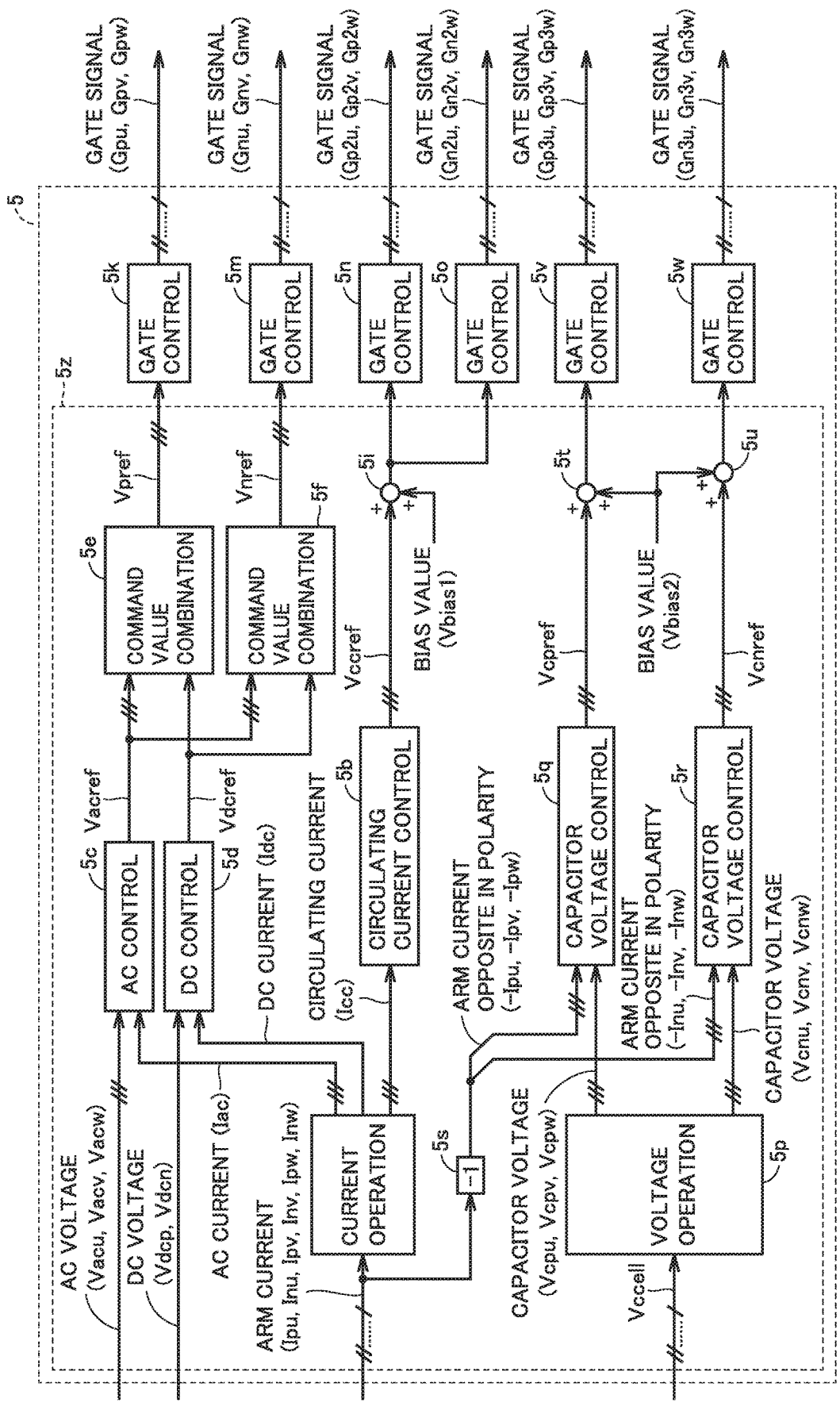
FIG. 6 is a configuration diagram of control device 5 included in the power conversion device according to a third embodiment.

FIG. 6 is a configuration diagram of control device 5 included in the power conversion device according to the third embodiment. Control device 5 in FIG. 6 is different from control device 5 in FIG. 4 in input signals to capacitor voltage control portions 5q and 5r. Specifically, capacitor voltage control portion 5q in FIG. 6 receives capacitor voltage Vcp (Vcpu of the U phase, Vcpv of the V phase, and Vcpw of the W phase) output from voltage operation portion 5p and a positive-side arm current value Ip (Ipu of the U phase, Ipv of the V phase, and Ipw of the W phase multiplied by −1 by gain circuit 5s, that is, a positive-side arm current value opposite in polarity (−Ipu, −Ipv, and −Ipw). Capacitor voltage control portion 5r in FIG. 6 receives capacitor voltage Vcn (Vcnu of the U phase, Vcnv of the V phase, and Vcnw of the W phase) output from voltage operation portion 5p and a negative-side arm current value In (Inu of the U phase, Inv of the V phase, and Inw of the W phase multiplied by −1 by gain circuit 5s, that is, a negative-side arm current value opposite in polarity (−Inu, −Inv, and −Inw). Since FIG. 6 is otherwise the same in configuration as FIG. 4, the same or corresponding elements have the same reference characters allotted and description will not be repeated.

[Operation of Control Device 5]

An operation of control device 5 in FIG. 6 will now be described. Description of an operation in common to that in FIG. 4 in the first embodiment will not be repeated.

Capacitor voltage control portion 5q in FIG. 6 carries out feedback control such that a capacitor voltage command value matches with capacitor voltage Vcp. Specifically, capacitor voltage control portion 5q is provided with a compensator which amplifies a difference between the capacitor voltage command value and capacitor voltage value Vcp (a value calculated by subtracting capacitor voltage value Vcp from the capacitor voltage command value) and a multiplier which multiplies the difference amplified by the compensator by a positive-side arm current opposite in polarity (−Ip) given from gain circuit 5s. A result of multiplication is output as voltage command value Vcpref.

(i) When the difference is positive (that is, the capacitor voltage command value is greater than capacitor voltage value Vcp) and positive-side arm current Ip is positive, capacitor voltage control portion 5q outputs negative voltage command value Vcpref. A conduction ratio of switching elements 1f and 1g provided in cell 20 in positive-side cell group 6c is controlled in accordance with a value calculated by adding bias value Vbias2 to negative voltage command value Vcpref. Charging with and discharging of capacitor voltage Vcp is controlled by interaction with both an AC component and a DC component contained in the arm current, so that capacitor voltage Vcp matches with the capacitor voltage command value.

(ii) When the difference is negative (that is, the capacitor voltage command value is smaller than capacitor voltage value Vcp) and positive-side arm current Ip is positive, capacitor voltage control portion 5q outputs positive voltage command value Vcpref. A conduction ratio of switching elements 1f and 1g provided in cell 20 in positive-side cell group 6c is controlled in accordance with a value calculated by adding bias value Vbias2 to positive voltage command value Vcpref. Charging with and discharging of capacitor voltage Vcp is controlled by interaction with both an AC component and a DC component contained in the arm current, so that capacitor voltage Vcp matches with the capacitor voltage command value.

Similarly, capacitor voltage control portion 5r carries out feedback control such that the capacitor voltage command value matches with capacitor voltage Vcn. Specifically, capacitor voltage control portion 5r is provided with a compensator which amplifies a difference between the capacitor voltage command value and capacitor voltage value Vcn (a value calculated by subtracting capacitor voltage value Vcn from the capacitor voltage command value) and a multiplier which multiplies the difference amplified by the compensator by a negative-side arm current opposite in polarity (−In) given from gain circuit 5s for each phase. A result of multiplication is output as voltage command value Vcnref. A conduction ratio of switching elements 1f and 1g provided in cell 20 in negative-side cell group 6d is controlled in accordance with a value obtained by addition of bias value Vbias2 to voltage command value Vcnref. Since an operation to control capacitor voltage Vcn of cell group 6d is the same as in the example of cell group 6c, description will not be repeated.

Effect of Third Embodiment

As set forth above, the power conversion device according to the third embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device as in the first and second embodiments. With cell groups 6a and 6b, an electric quantity of each of AC terminals Nu, Nv, and Nw and DC terminals Np and Nn can reliably be controlled without interference by control of a circulating current.

Furthermore, the power conversion device according to the third embodiment can control a value of a circulating current in accordance with a circulating current command value by including cell groups 6c and 6d for control of a circulating current as in the first and second embodiments. Each cell 20 constituting cell groups 6c and 6d includes dedicated switching elements 1a and 1b for control of a circulating current and dedicated switching elements 1f and 1g which control a difference between a voltage value of DC capacitor 1e and a command value thereof to zero. Since a capacitor voltage of each cell 20 in cell groups 6c and 6d for control of a circulating current can thus be maintained at a constant value, control of a circulating current can be controlled in a stable manner and independently of maintaining of a capacitor voltage.

[Modification]

In each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portions 5n and 5v, adder 5t, and capacitor voltage control portion 5q associated therewith are not required either, which is advantageous in simplification of the configuration of control device 5. Similarly, when only reactor 7a on the positive side is provided, negative-side cell group 6d for control of a circulating current is not required and gate control portions 5o and 5w, adder 5u, and capacitor voltage control portion 5r associated therewith are not required either, which is advantageous in simplification of the configuration of control device 5.

In the third embodiment, description has been given assuming that cell group 6a and cell group 6b not for control of a circulating current are configured with identical cells 1, however, each cell in cell group 6a and each cell in cell group 6b may be different from each other in configuration. An effect the same as in the third embodiment described above is achieved also in this case.

In the embodiment, an example in which outputs from the compensators are multiplied by a positive-side arm current value opposite in polarity (−Ip) and a negative-side arm current value opposite in polarity (−In) in capacitor voltage control portions 5q and 5r, respectively, is shown. In contrast, when feedback control based on a difference between AC current command value Iacref and AC current value Iac is carried out in AC control portion 5c and feedback control based on a difference between DC current command value Idcref and DC current value Idc is carried out in DC control portion 5d, modification as follows can be made. Specifically, Iacref+Idcref/3 may be used instead of positive-side arm current value Ip, and −Iacref+Idcref/3 may be used instead of negative-side arm current value In. Instead of DC current value Idc, a polarity thereof may be used, and instead of DC current command value Idcref and an AC current command value Iacref, a polarity thereof may be used. The effect the same as in the third embodiment described above is achieved in any modification.

It should be understood that the embodiments disclosed herein are illustrative and non-restrictive in every respect. The scope of this invention is defined by the terms of the claims rather than the description above and is intended to include any modifications within the scope and meaning equivalent to the terms of the claims.

REFERENCE SIGNS LIST 1, 20 cell; 1a, 1b, 1f, 1g switching element; 1c, 1d, 1h, 1i diode; 1e DC capacitor; 1j, 11a, 11b DC voltage detector; 1n, 1p input and output terminal; 2 AC circuit; 3 interconnected transformer; 4 DC circuit; 5 control device; 5a current operation portion; 5b circulating current control portion; 5c AC control portion; 5d DC control portion; 5e, 5f command value combination portion; 5i, 5t, 5u adder; 5k, 5m, 5n, 5o, 5v, 5w gate control portion; 5p voltage operation portion; 5q, 5r capacitor voltage control portion; 5s gain circuit; 5z voltage command value generation portion; 6a, 6c positive-side cell group; 6b, 6d negative-side cell group; 7a, 7b reactor; 8a, 8b, 8c leg circuit; 9a, 9b arm current detector; 10 AC voltage detector; Iac AC current; Icc circulating current; Icom leg current; Idc DC current; Ip positive-side arm current; In negative-side arm current; Nn negative-side DC terminal; Np positive-side DC terminal; Nu, Nv, Nw AC terminal; Vcn, Vcp capacitor voltage value; and Vdc value of voltage across DC terminals

The invention claimed is:

1. A power conversion device which converts power between a DC circuit and an AC circuit, the power conversion device comprising:
a plurality of leg circuits which correspond to respective phases of the AC circuit and are connected in parallel between common first and second DC terminals,
each leg circuit including:
a plurality of converter cells cascaded to one another and each including an energy storage; and
at least one inductor connected in series to the plurality of converter cells,
each of a plurality of specified converter cells which are some of the plurality of converter cells included in each leg circuit including:
a capacitor as the energy storage;
first and second switching elements connected in parallel to the capacitor and connected in series to each other; and
third and fourth switching elements connected in parallel to the capacitor and connected in series to each other,
the capacitor being capable of being charged and discharging through a connection node of the first and second switching elements and a connection node of the third and fourth switching elements; and
a control device which controls operations of the plurality of converter cells included in each leg circuit,
the control device controlling operations of the first and second switching elements of each specified converter cell based on a circulating current which circulates through each leg circuit, wherein the first and the second switching elements are exclusively used to control the circulating current,
the control device controlling operations of the third and fourth switching elements of each specified converter cell based on a voltage of the capacitor of each specified converter cell, wherein the third and fourth switching elements are exclusively used to control a difference between a voltage of the cell capacitor and a command value thereof to zero.

2. The power conversion device according to claim 1, wherein the control device calculates a difference between a representative value of capacitor voltages of the plurality of specified converter cells and a command value of the capacitor voltage for each leg circuit, and controls operations of the third and fourth switching elements of each specified converter cell based on a result of multiplication between a value obtained by amplification of the calculated difference and an AC current value from the AC circuit or a polarity of the AC current value.

3. The power conversion device according to claim 1, wherein:
the control device controls operations of remaining converter cells except for the plurality of specified converter cells of each leg circuit at least based on a difference between an AC current value from the AC circuit and an AC current command value; and
the control device calculates a difference between a representative value of capacitor voltages of the plurality of specified converter cells and a command value of the capacitor voltage for each leg circuit, and controls operations of the third and fourth switching elements of each specified converter cell based on a result of multiplication between a value obtained by amplification of the calculated difference and the AC current command value or a polarity of the AC current command value.

4. The power conversion device according to claim 1, wherein the control device calculates a difference between a representative value of capacitor voltages of the plurality of specified converter cells and a command value of the capacitor voltage for each leg circuit, and controls operations of the third and fourth switching elements of each specified converter cell based on a result of multiplication between a value obtained by amplification of the calculated difference and a DC current value from the DC circuit or a polarity of the DC current value.

5. The power conversion device according to claim 1, wherein:
the control device controls operations of remaining converter cells except for the plurality of specified converter cells of each leg circuit at least based on a difference between a DC current value from the DC circuit and a DC current command value; and
the control device calculates a difference between a representative value of capacitor voltages of the plurality of specified converter cells and a command value of the capacitor voltage for each leg circuit, and controls operations of the third and fourth switching elements of each specified converter cell based on a result of multiplication between a value obtained by amplification of the calculated difference and the DC current command value or a polarity of the DC current command value.

6. The power conversion device according to claim 1, wherein:
each leg circuit is divided into a first arm on a high potential side and a second arm on a low potential side with a connection portion electrically connected to a corresponding phase of the AC circuit being interposed;
the first arm of each leg circuit includes:
a plurality of first converter cells controlled not based on the circulating current;

a plurality of second converter cells controlled based on the circulating current; and
a first inductance;
the second arm of each leg circuit includes:
a plurality of third converter cells controlled not based on the circulating current;
a plurality of fourth converter cells controlled based on the circulating current; and
a second inductance; and
the plurality of specified converter cells correspond to the plurality of second and fourth converter cells.

7. The power conversion device according to claim 1, wherein:
each leg circuit is divided into a first arm on a high potential side and a second arm on a low potential side with a connection portion electrically connected to a corresponding phase of the AC circuit being interposed;
the first arm of each leg circuit includes:
a plurality of first converter cells controlled not based on the circulating current;
a plurality of second converter cells which are controlled based on the circulating current and correspond to the plurality of specified converter cells; and
an inductance; and
the second arm of each leg circuit includes a plurality of third converter cells controlled not based on the circulating current.

8. The power conversion device according to claim 1, wherein:
each leg circuit is divided into a first arm on a high potential side and a second arm on a low potential side with a connection portion electrically connected to a corresponding phase of the AC circuit being interposed;
the first arm of each leg circuit includes a plurality of first converter cells controlled not based on the circulating current; and
the second arm of each leg circuit includes:
a plurality of third converter cells controlled not based on the circulating current;
a plurality of fourth converter cells which are controlled based on the circulating current and correspond to the specified converter cell; and
an inductance.

9. The power conversion device according to claim 6, wherein the control device calculates a difference between a representative value of capacitor voltages of the plurality of second converter cells and a command value of the capacitor voltage for each leg circuit, and controls operations of the third and fourth switching elements of each second converter cell based on a result of multiplication between a value obtained by amplification of the calculated difference and a current value of the first arm or a polarity of the current value.

10. The power conversion device according to claim 6, wherein:
the control device controls operations of the plurality of first converter cells of each leg circuit at least based on a difference between an AC current value from the AC circuit and an AC current command value and a difference between a DC current value from the DC circuit and a DC current command value; and
the control device calculates a difference between a representative value of capacitor voltages of the plurality of second converter cells and a command value of the capacitor voltage, and controls operations of the third and fourth switching elements of each second converter cell based on a result of multiplication between an addition value obtained by adding the AC current command value to one third of the DC current command value or a polarity of the addition value and a value obtained by amplification of the calculated difference.

11. The power conversion device according to claim 6, wherein the control device calculates a difference between a representative value of capacitor voltages of the plurality of fourth converter cells and a command value of the capacitor voltage for each leg circuit, and controls operations of the third and fourth switching elements of each fourth converter cell based on a result of multiplication between a value obtained by amplification of the calculated difference and a current value of the second arm or a polarity of the current value.

12. The power conversion device according to claim 6, wherein:
the control device controls operations of the plurality of third converter cells of each leg circuit at least based on a difference between an AC current value from the AC circuit and an AC current command value and a difference between a DC current value from the DC circuit and a DC current command value; and
the control device calculates a difference between a representative value of capacitor voltages of the plurality of fourth converter cells and a command value of the capacitor voltage, and controls operations of the third and fourth switching elements of each fourth converter cell based on a result of multiplication between a subtraction value calculated by subtracting the AC current command value from one third of the DC current command value or a polarity of the subtraction value and a value obtained by amplification of the calculated difference.

* * * * *